United States Patent [19]
Yamato et al.

[11] Patent Number: 5,384,766
[45] Date of Patent: Jan. 24, 1995

[54] LAN MANAGEMENT SYSTEM IN ELECTRONIC SWITCHING APPARATUS

[75] Inventors: Kouji Yamato; Kazuhiko Ito, both of Kawasaki, Japan

[73] Assignee: Fujitsu Limited, Kawasaki, Japan

[21] Appl. No.: 125,028

[22] Filed: Sep. 21, 1993

[30] Foreign Application Priority Data

Sep. 21, 1992 [JP] Japan .................. 4-251075

[51] Int. Cl.6 .......................... H04J 3/14; H04Q 11/04
[52] U.S. Cl. ..................... 370/13; 370/58.2; 370/84; 370/112; 340/825.06
[58] Field of Search ............ 370/13, 14, 16, 53, 370/58.1, 58.2, 58.3, 60, 60.1, 61, 66, 67, 77, 84, 85.6, 85.13, 85.14, 94.1, 94.3, 110.1, 112; 340/827, 825.06, 825.15, 825.16, 825.17, 825.36, 825.5, 825.51; 379/93, 94, 95, 96; 371/20.1, 48, 68.1, 68.2, 68.3

[56] References Cited

U.S. PATENT DOCUMENTS

| | | | |
|---|---|---|---|
| 4,244,046 | 1/1981 | Brouard et al. | 370/84 |
| 4,375,681 | 3/1983 | Abbott et al. | 370/16 |
| 4,535,448 | 8/1985 | Baxter et al. | 370/85.9 |
| 4,601,028 | 7/1986 | Huffman et al. | 370/84 |
| 4,740,963 | 4/1988 | Eckley | 370/110.1 |
| 5,005,170 | 4/1991 | Nelson | 370/84 |
| 5,005,171 | 4/1991 | Modisette, Jr. et al. | 370/84 |
| 5,058,104 | 10/1991 | Yonehara et al. | 370/112 |

FOREIGN PATENT DOCUMENTS 62-286351 12/1987 Japan .

Primary Examiner—Douglas W. Olms
Assistant Examiner—Alpus H. Hsu

[57] ABSTRACT

A switching apparatus for constructing a system integrating a telephone switching network and a LAN includes: line interface sections, each connected to a transmission line for transmitting a signal on which low-speed data and high-speed data are multiplexed; a low-speed data switch for switching low-speed data demultiplexed in each line interface section; a high-speed data switch for switching high-speed data demultiplexed in each line interface section; and a processor for monitoring and controlling the data traffic passing through the low-speed data switch and high-speed data switch. An address in a designated position in the high-speed data demultiplexed in each line interface section is read out, whereby the association between the low-speed data terminal and high-speed data terminal is identified and stored. By referring to this association, management of LAN terminals can be performed using the maintenance operation procedures used in a conventional electronic switching apparatus.

8 Claims, 8 Drawing Sheets

Fig. 4

| LINE SERVICE LOCATION | TELEPHONE NUMBER | MAC ADDRESS | NETWORK ADDRESS | | |
|---|---|---|---|---|---|
| $X_{25}$ | $N_{25}$ | jjjjjjjjjjjj | yyyyy | | |
| $X_{35}$ | $N_{35}$ | kkkkkkkkkkkk | zzzzzz | | |
| | | | | | |
| | | | | | |

Fig.5

| FLG | SID | FC | DA | SA | LLC PDU | FCS | FLG |

[TRANSMISSION FRAME] : FRAME CYCLE 125 μs, 64 BYTE/FRAME

LAN MANAGEMENT SYSTEM IN ELECTRONIC SWITCHING APPARATUS

BACKGROUND OF THE INVENTION

1. Field of the Invention

The present invention relates to a LAN management system for managing a LAN in an electronic switching apparatus, and more particularly to a LAN management system in an electronic switching apparatus, which realizes transmission of voice, low-speed data, and high-speed data over a single line served by the switching apparatus, as in an integrated voice/data LAN (IVD-LAN), and which permits a telephone terminal, a data terminal, and a LAN terminal (high-speed data terminal) to be connected at one end of the line.

2. Description of the Related Art

Switching systems serving telephone terminals, and low-speed data terminals, and local area network (LAN) systems interconnecting high-speed data terminals are usually constructed independently of each other. In recent years, however, a system integrating a switching system and a LAN system, such as an integrated voice/data LAN (IVD-LAN), has been developed which allows transmission of voice, low-speed data, and high-speed data over a single line.

In such an IVD-LAN system, ISDN signals and LAN signals are time-division multiplexed to accomplish physical integration of the two systems. In the conventional system, however, integration of the two systems is only accomplished at the physical layer, and the higher layers are independently of each other, requiring separate management for each network.

More particularly, the telephone and low-speed data terminals are maintained and operated differently from the LAN terminals, and different departments are assigned to maintain the respective systems. Therefore, in the integrated voice/data LAN, the switching system and the LAN system are maintained by different personnel.

When trouble occurs, for example, disabling communication between LAN terminals, maintenance personnel in charge of the electronic switching apparatus and maintenance personnel in charge of the LAN perform separate tests and analyses from their respective positions. Furthermore, when the different persons in charge of maintenance operation do not have knowledge of both the electronic switching and LAN, if either person is late in arriving at the site in the event of trouble, it increases the time before the system can be restored, thus causing great inconvenience to the user.

SUMMARY OF THE INVENTION

In view of the above problems, it is an object of the present invention to provide a LAN management system in an electronic switching apparatus, which allows LAN terminals in an integrated voice/data LAN or the like to be managed using the same procedures as employed for the electronic switching apparatus.

According to the present invention, there is provided a switching apparatus to which a plurality of low-speed terminals and a plurality of high-speed terminals are connected via a plurality of transmission lines each for transmitting a signal on which low-speed data from a low-speed terminal and high-speed data from a high-speed terminal are multiplexed, and which is suitable for constructing a switching network among the low-speed terminals and a local area network among the high-speed terminals, comprising: a plurality of line interface sections, each connected to one of the transmission lines, for demultiplexing the multiplexed signal fed via the transmission line connected thereto into low-speed data and high-speed data, and for multiplexing low-speed data and high-speed data for transmission over the transmission line connected thereto; a low-speed data switch, connected to the line interface sections, for performing switching of the low-speed data; a high-speed data switch, connected to the line interface sections, for performing switching of the high-speed data; storage means for storing the association between the low-speed terminal and high-speed terminal connected to each transmission line; and monitoring control means, connected to the low-speed data switch, high-speed data switch, and storage means, for monitoring and controlling the traffic of low-speed data among the low-speed terminals, and for monitoring and controlling the traffic of high-speed data among the high-speed terminals in association with their correponding low-speed terminals on the basis of the association stored in the storage means.

BRIEF DESCRIPTION OF THE DRAWINGS

FIG. 4 is a diagram showing the association between telephones and LAN terminals;

FIG. 5 is a diagram showing the format of data transmitted between LAN terminal 12A, 12B and terminal adapter 32A, 32B in FIG. 3;

DESCRIPTION OF THE PREFERRED EMBODIMENTS

Figure 1:
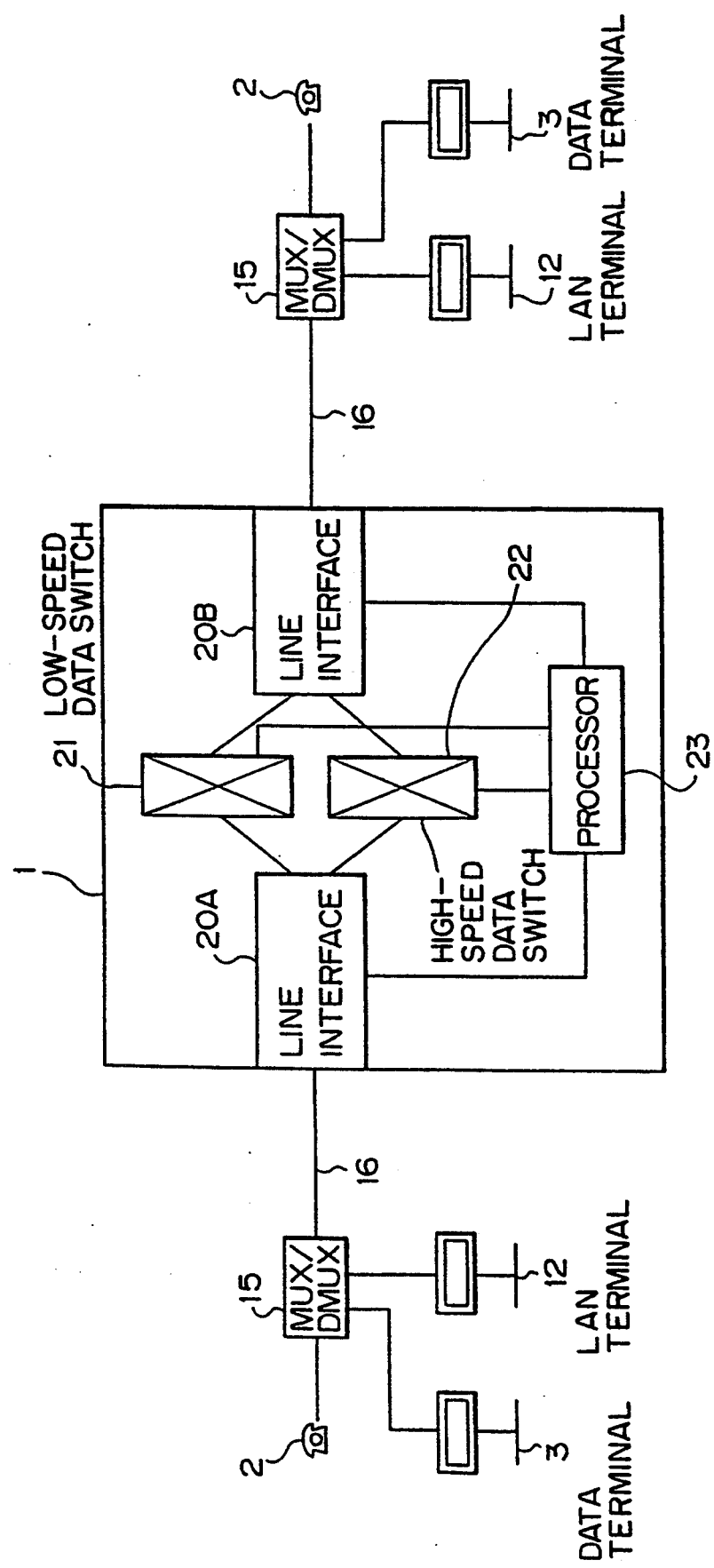
FIG. 1 is a block diagram showing the basic configuration of a system integrating a telephone switching network and a LAN according to the present invention.

FIG. 1 is a diagram showing the basic configuration of a system integrating a telephone switching network and a LAN according to the present invention. The system shown comprises a multiplexer/demultiplexer 15 to which a telephone 2, a low-speed data terminal 3, and a LAN terminal (high-speed data terminal) 12 are connected, and which is connected to an electronic switching apparatus 1 via a line 16. The other side of the electronic switching apparatus 1 has the same configuration.

The electronic switching apparatus 1 includes two line interface sections, 20A and 20B, which interface with the respective lines 16. The numeral 21 indicates a low-speed data switch for performing switching of low-speed data, 22 indicates a high-speed data switch for performing switching of high-speed data, and 23 indicates a processor for controlling the switching operations of these two switches 21 and 22. The low-speed data switch 21 is constructed, for example, from a time-division (TD) switch.

Data from the telephone 2, low-speed data terminal 3, and LAN terminal (high-speed data terminal) 12 are multiplexed by the multiplexer/demultiplexer (terminal adapter) 15 onto the single line 16 and transmitted to the corresponding line interface section 20A in the electronic switching apparatus 1. The multiplexed data are demultiplexed in the line interface section 20A; the voice and low-speed data are directed to the low-speed data switch 21 and the high-speed data directed to the high-speed data switch 22 for switching. The data are again multiplexed in the line interface section 20B to which the receiving party is connected, and are transmitted to the multiplexer/demultiplexer 15. The voice, low-speed data, and high-speed data may be addressed to different destinations.

As will be described in detail, the line interface sections, 20A and 20B, have a number of functions including a data transmit control function whereby transmission of high-speed data is stopped and started as desired by an instruction from the processor 23, and a function for detecting addresses (MAC address, network address, etc.) contained in the high-speed data and for notifying the same to the processor 23.

The high-speed data switch 22 has a traffic measuring function for measuring the high-speed data traffic as well as a function for detecting abnormality in the traffic distribution pattern. These features enable the processor 23 to monitor the high-speed data traffic as well as the low-speed data traffic which was monitored by a processor provided in a conventional electronic switching apparatus. Furthermore, by making use of the feature that high-speed data is transmitted over the line used for the transmission of voice, management of the high speed data terminals can be performed in association with the corresponding voice and data terminals, thus allowing the maintenance procedures for the electronic switching apparatus 1 to be applied to the high-speed data as well.

Figure 2:
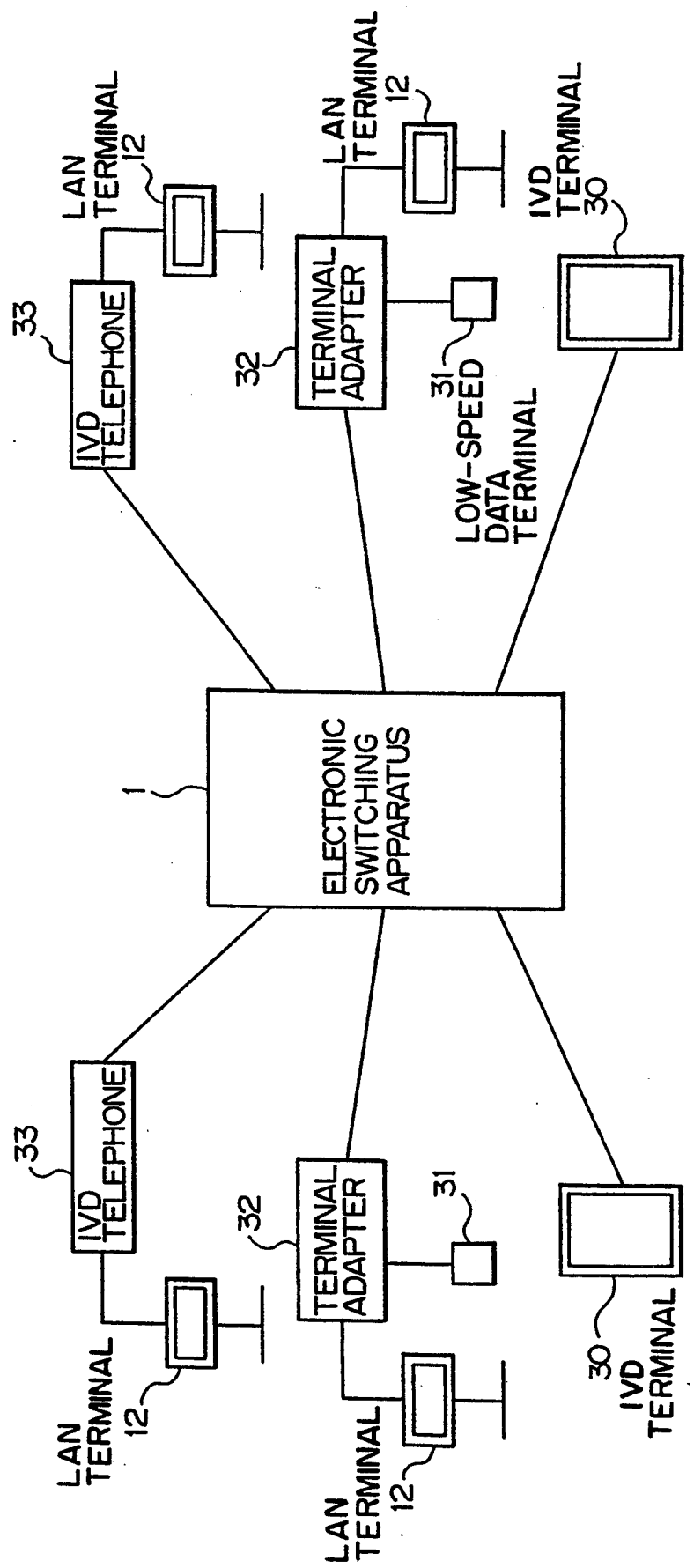
FIG. 2 is a block diagram showing an example of an IVD-LAN configuration.

An integrated voice/data LAN (IVD-LAN) will be described below as an example of a system implemented to accommodate telephone and low-speed data terminals and LAN terminals on the same line served by an electronic switching apparatus. FIG. 2 is a block diagram showing the configuration of a common IVD-LAN. In the figure, the reference numeral 1 is an electronic switching apparatus, 30 is an IVD terminal having combined functions of a telephone, a low-data terminal, and a LAN terminal, 31 is a telephone having combined functions of a telephone and a low-speed data terminal, 32 is a terminal adapter (multiplexer/demultiplexer) for controlling a LAN terminal 12 as well as the telephone 31, and 33 is an IVD telephone having the capability of interfacing a LAN terminal.

As shown in FIG. 2, any of the three types of terminals, the IVD terminal 30 having the combined functions of telephone 31 and LAN terminal 12, the terminal adapter 32 for controlling both telephone 31 and LAN terminal 12, or the IVD telephone 33 with LAN terminal 12 connected to it, may be connected to the electronic switching apparatus 1. For simplicity, the following description deals with a system in which the terminal adapter 32 for controlling both telephone 31 and LAN terminal 12 is connected to the electronic switching apparatus 1.

Figure 3:
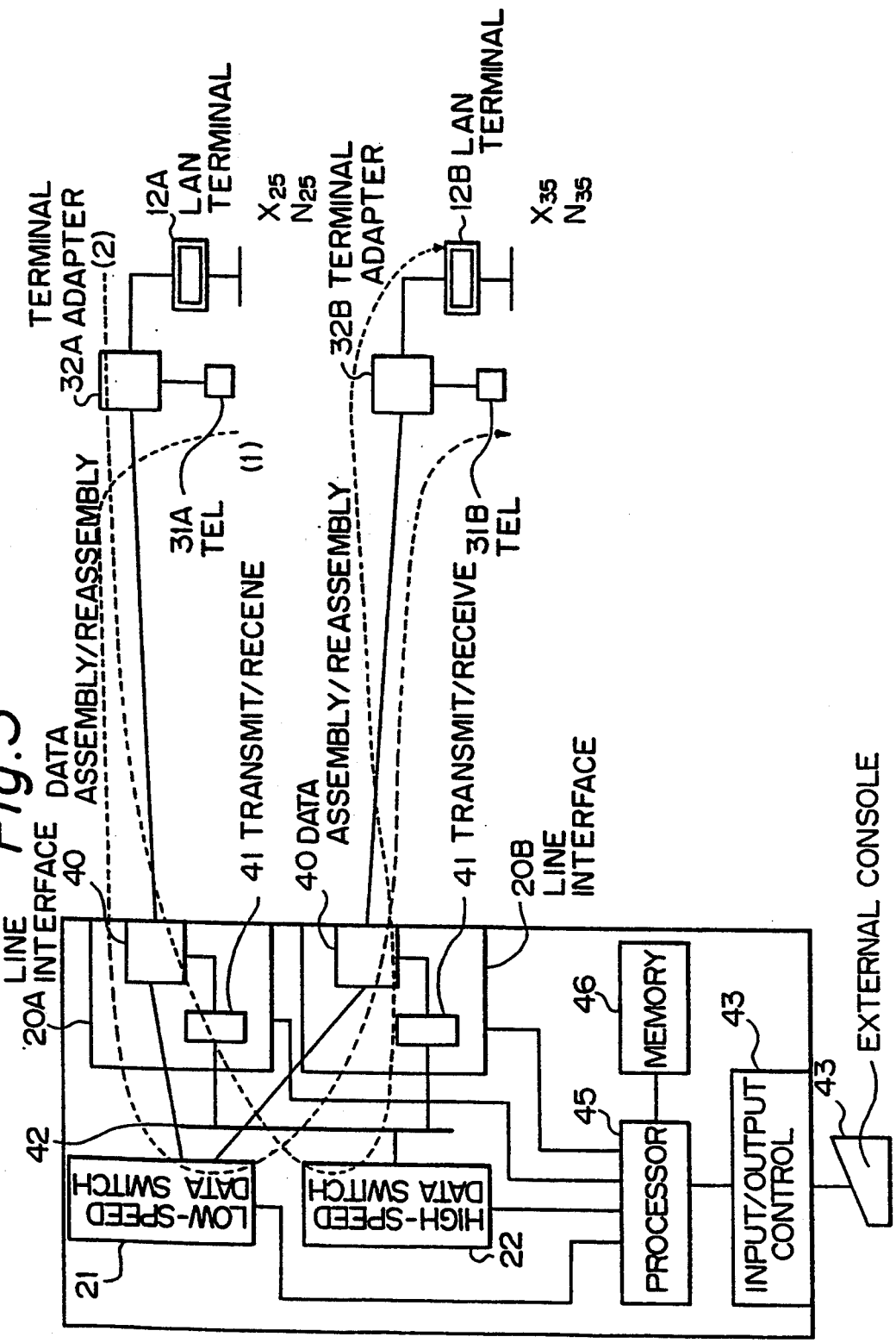
FIG. 3 is a diagram illustrating data flow in the configuration of FIG. 2.

FIG. 3 is a diagram showing the flow of communication data in this system. In the figure, a terminal adapter 32A which controls a telephone 31A and a LAN terminal 12A is connected to the line interface section 20A in the electronic switching apparatus 1 and is assigned a telephone service location number X25 and a telephone number N25. Likewise, the other terminal adapter 32B to which a telephone 31B and a LAN terminal 12B are connected is connected to the line interface section 20B and is assigned a telephone service location number X35 and a telephone number N35.

A data disassembly/reassembly control section 40 contained in the line interface section 20A has the function of disassembling (demultiplexing) a signal fed via the line into voice and low-speed data and high-speed data (data from the LAN terminal) and reassembling (multiplexing) such data for transmission over the same line. A high-speed data transmit/receive section 41 is connected to the high-speed data switch 22 via a high-speed data communication bus 42 for transmission of high-speed data. The low-speed data switch 21 performs switching of the voice and low-speed data received from the data disassembly/reassembly section 40.

Suppose that the telephone number N35 is called from the telephone 31A (telephone number N25) connected to the terminal adapter 32A, as shown by a dotted line (1). Data from the telephone 31A is disassembled by the data disassembly/reassembly section 40 in the line interface section 20A, switched by the low-speed data switch 21 to the line interface section 20B connected to the terminal adapter 20B, reassembled by the data disassembly/reassembly section 40 in the line interface section 20B, and then sent out to the telephone 31B connected to the terminal adapter 32B.

Likewise, data transmitted from the LAN terminal 12A connected to the terminal adapter 32A is carried as shown by a dotted line (2). That is, the data is disassembled by the data disassembly/reassembly section 40 in the line interface section 20A and placed into the high-speed data transmit/receive section 41; the data is then transferred via the high-speed data communication bus 42 to the high-speed data switch 22 which directs the data to the high-speed data transmit/receive section 41 in the line interface section 20B. If the data is destined for the LAN terminal 12B connected to the terminal adapter 32B, the data is transferred to the data disassembly/reassembly section 40 in the line interface section 20B for transmission to the LAN terminal 12B connected to the terminal adapter 32B.

As described, in the case of high-speed data communication, data is always transferred via the high-speed data communication bus 42 without requiring any operations for connection, and is sent to the necessary section (the line interface section connected to the destination terminal) to accomplish transmission of the data. Usually, the LAN terminals 12A and 12B are each assigned a MAC address indicating the physical number uniquely assigned to the terminal, and a network or IP address indicating the logical number defined by the communication protocol. Data transmission and reception between the LAN terminals is performed using these numbers. FIG. 4 is a diagram showing the association between telephone and LAN terminals. The line service location, MAC address, and network address are predetermined for each of the telephones N25 and N35.

However, the operator operating the LAN terminal need not be aware of these addresses, unlike the telephone number used for communication by telephone. As a result, in the conventional IVD-LAN system, if trouble occurs at the terminal the user uses in his daily work, he does not know the number (the above-mentioned MAC address and network address) to identify his terminal when reporting the trouble, thus causing an extra load on the side of the maintenance personnel.

In FIG. 3, the numeral 43 is an input/output control section, 45 is a processor, 46 is a memory, and 44 is an external console.

Figure 5:
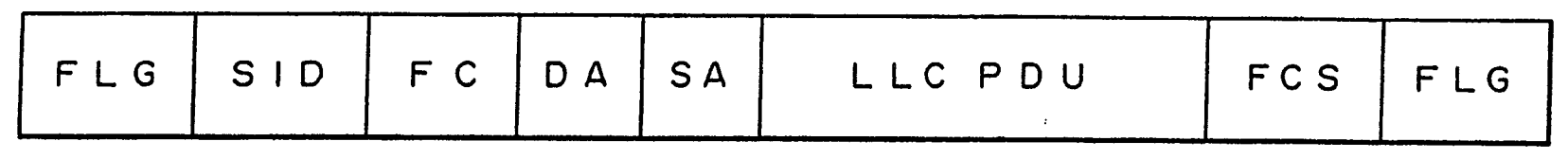
Figure 6:
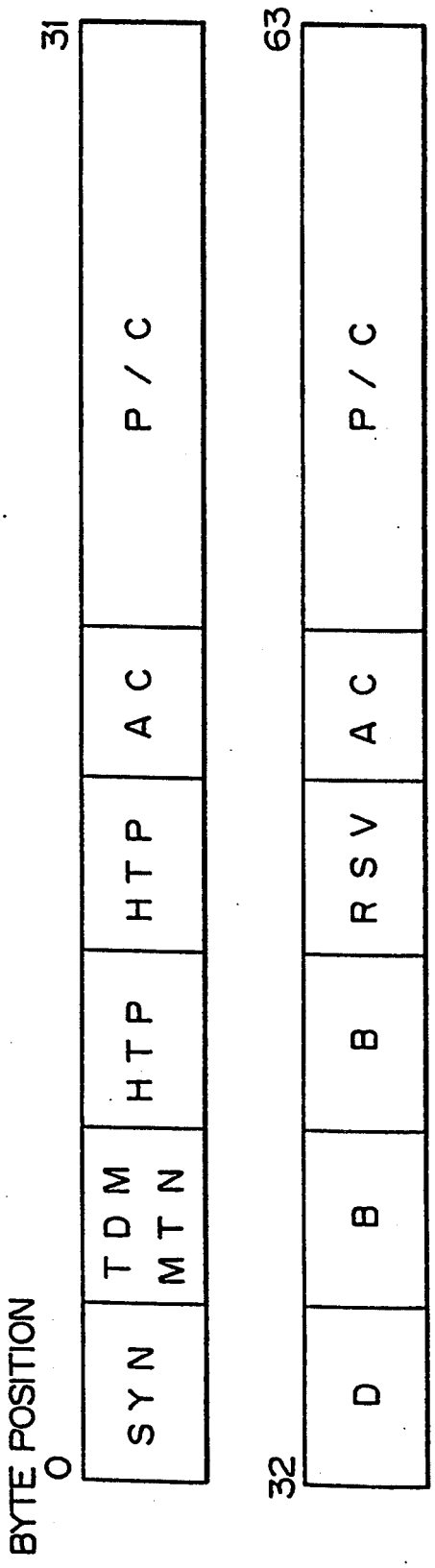
FIG. 6 is a diagram showing the format of data transmitted between terminal adapter 32A, 32B and line interface section 20A, 20B in FIG. 3.

FIG. 5 shows the format of data transmitted between the LAN terminal, 12A or 12B, and the terminal adapter, 32A or 32B, in FIG. 3. The MAC addresses of the transmitting and receiving terminals are stored in SA and DA fields, respectively. The network addresses of the transmitting and receiving terminals are stored in designated areas within the LLC PDU. FIG. 6 shows the format of data transmitted between the terminal adapter, 32A or 32B, and the line interface section, 20A or 20B, in FIG. 3. Data, of the format shown in FIG. 5, received from the LAN terminal is stored in P/C field, while data from the telephone are stored in D and B fields.

Figure 7:
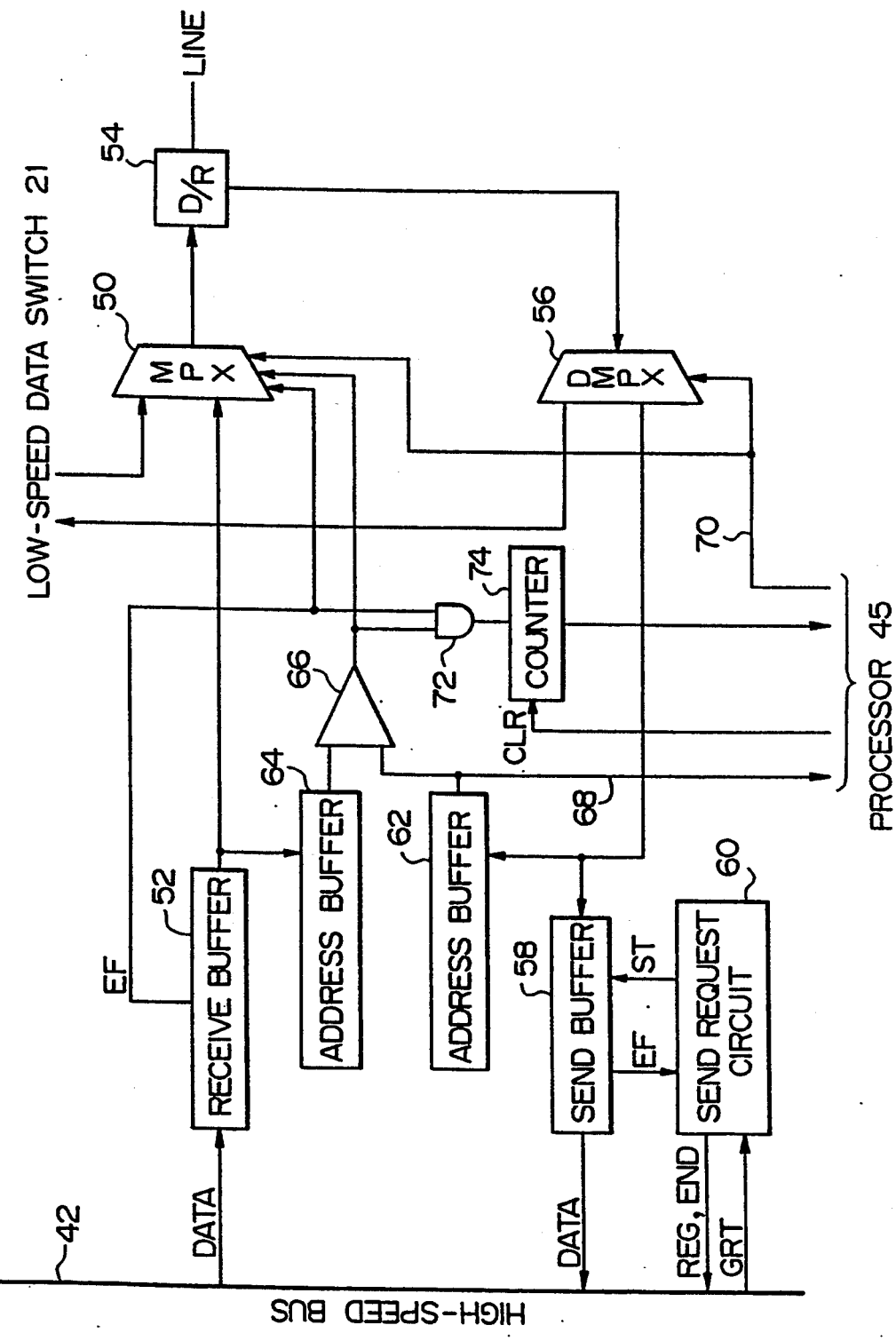
FIG. 7 is a block diagram showing a detailed configuration of the line interface section 20A, 20B.

FIG. 7 is a block diagram showing a detailed configuration of the line interface section 20A, 20B.

Low-speed data transferred from the low-speed data switch 21 and high-speed data transferred from the high-speed bus 42 via a receive buffer 52 are time-division multiplexed by a multiplexer 50 into data of the frame format shown in FIG. 6 for transfer to a driver/receiver 54. A demultiplexer 56 demultiplexes the data received from the driver/receiver 54, and directs the low-speed data to the low-speed data switch 21 and the high-speed data to the high-speed data bus 42 via a send buffer 58.

When data is stored into the send buffer 58, an empty flag (EF) is reset to notify a send request circuit 60 accordingly. The send request circuit 60 sends a request (Req) signal to the high-speed bus 42 and waits for a grant (Grt) signal to be returned. When the Grt signal is returned, the send request circuit 60 sends a start (ST) signal to the send buffer 58, upon which the contents of the send buffer 58 are sent to the high-speed bus 42. The send buffer 58 is emptied, and EF is set to notify the send request circuit 60 accordingly. Upon receiving the notification, the send request circuit 60 sends an end (End) flag to the high-speed bus 42. In the meantime, the address data contained in the designated area of the high-speed data being stored into the send buffer 58 is read out and stored into an address buffer 62.

When data is placed on the high-speed bus, the data is read into the receive buffer 52. The address data contained in the designated area of the high-speed data stored in the receive buffer 52 is read out and stored into an address buffer 64. The source address stored in the address buffer 62 and the destination address stored in the address buffer 64 are compared in a comparator 66. When both addresses agree, it is determined that the high-speed data stored in the receive buffer 52 is destined for the data terminal connected to the line interface section; therefore, the data in the receive buffer 52 is time-division multiplexed by the multiplexer 50 and transferred to the driver/receiver 54.

In the above configuration, the address stored in the address buffer 62 is also transferred to the processor 45 via a signal line 68. The processor 45 is thus notified of the addresses (MAC address and network address) of the LAN terminal connected to each line interface section as well as the association between the telephone and LAN terminal connected to the same line interface section. Data of the format shown in FIG. 4 can thus be stored in the memory 46 (FIG. 3). This enables the operator of the LAN terminal 12A to identify the LAN terminal by specifying the telephone number even if he does not know its MAC address or network address.

Furthermore, by outputting the data of the format of FIG. 4 stored in the memory 46 to the external console 44 connected to the input/output control section 43 (see FIG. 3), it is possible to know the MAC address and network address of every LAN terminal connected to the electronic switching apparatus 1. This improves the maintainability of the LAN terminals.

Turning back to FIG. 7, the multiplexing of high-speed data by the multiplexer 50 and demultiplexing by the demultiplexer 56 can be controlled from the processor 45 via a control line 70. Accordingly, when any LAN terminal connected to the electronic switching apparatus becomes faulty, giving rise to a situation that may cause trouble to the system, or when it is necessary to prevent communication with a particular LAN terminal, for example, the electronic switching apparatus 1 can disable or enable communication with that particular LAN terminal based on the association table of FIG. 4 by specifying the telephone number or line service location as in the blocking operation performed in telephone maintenance procedures.

Furthermore, the number of data frames sent to the LAN terminal connected to each line interface section is counted by a counter 74 via an AND gate 72 and notified to the processor 45. The counter 74 is reset when an instruction is given from the processor 45. In this manner, the processor 45 is able to know whether the traffic is abnormally high for any particular LAN terminal. At the same time, the processor 45 is able to check for the presence or absence of a response from other LAN terminals. That is, when a situation is detected where, despite data being sent to a particular LAN terminal, no data is returned from that particular LAN terminal for a prescribed period of time, the situation is then determined as an equivalent of the so-called telephone line lockout as used in electronic switching terminology, and an alarm indication is displayed on the electronic switching apparatus 1 to indicate that a fault condition has occurred at the LAN terminal.

In an alternative method, the telephone number N25, N35 of the telephone terminal 31A, 31B connected to the same line is obtained from the association table of FIG. 4, and a call is sent to the telephone so that the answering person can hear an audible alarm, or in the case of an multi-function telephone, an alarm indication is displayed on the telephone, to notify the user of the trouble at the LAN terminal. In another method, broadcasting may be used to call all operators to the telephone at the same time.

When a situation is detected where the traffic from a particular LAN terminal is abnormally high, causing significant effects on the system operation, the line service location is obtained from the MAC address of that particular LAN terminal with reference to the association table of FIG. 4, and a deactivation request is automatically issued to the line interface section connected to that LAN terminal to stop the transmission of high-speed data to and from that LAN terminal, thereby bringing the traffic on the LAN back to the normal level. The fault detection algorithm used may be such that the same size data addressed to the same destination occurs more than a prescribed number of times in succession within a prescribed length of time, for example.

Figure 8:
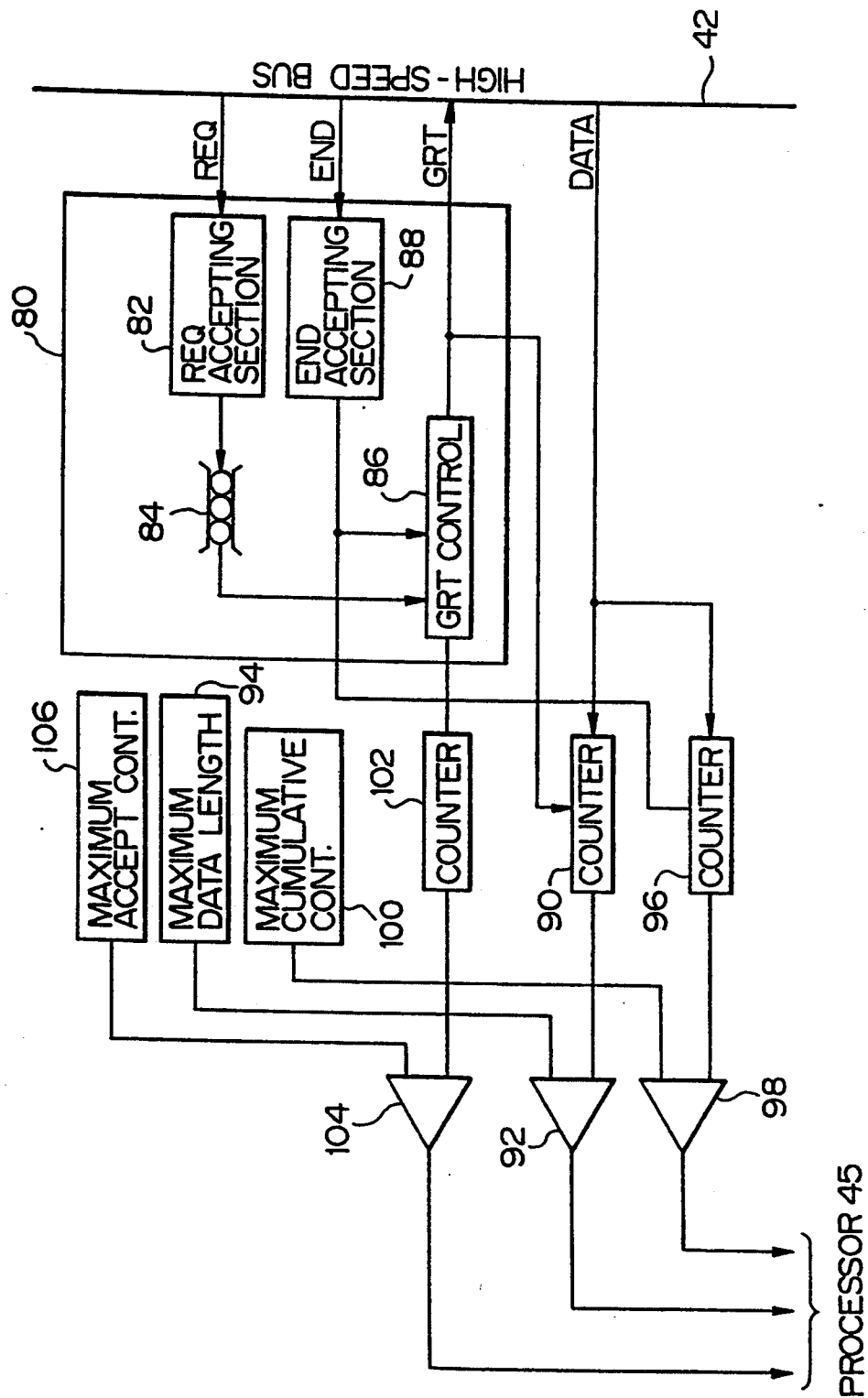
FIG. 8 is a block diagram showing a detailed configuration of a high-speed data switch 22.

FIG. 8 is a block diagram showing a detailed configuration of the high-speed data switch 22. The switching control section 80 that performs the switching control of high-speed data includes a Req accepting section 82, a work queue 84, a Grt control section 86, and an End accepting section 88. The Req accepting section 82 accepts the Req signal as it is placed on the high-speed bus 42, and stores the signals into the work queue 84 in the order in which they are accepted. The Grt control section 86 sequentially accepts the Req signals stored in the work queue 84 and sends a Grt signal to the high-speed bus 42 upon acceptance of each Req signal. The End accepting section 88 reads the End signal placed on the high-speed bus 42 and notifies it to the Grt control section 86. Upon receiving notification of the End signal, the Grt control section 86 accepts the next Req signal stored in the work queue 84. As described above, the switching control section 80 simply performs processing as a bus arbiter; high-speed data switching is accomplished by each line interface section 20A, 20B extracting only the data addressed to itself from the data placed on the high-speed bus.

A counter 90 counts the number of data blocks output on the high-speed bus 42 and is reset each time the Grt signal is output. The counter 90 thus measures the data length. The value of the counter 90 is compared by a comparator 92 with the value of a maximum data length 94, and the result of the comparison is notified to the processor 45.

A counter 96 counts the number of data blocks output on the high-speed bus 42 and is reset each time the End signal is output. The counter 96 thus measures the cumulative data length before the End signal is output. The value of the counter 96 is compared by a comparator 98 with the value of a maximum cumulative count 100, and the result of the comparison is notified to the processor 45.

A counter 102 counts the number of signals accepted by the Grt control section 86. The counted value is compared by a comparator 104 with the value of a maximum accepted count 106, and the result of the comparison is notified to the processor 45.

As described above, according to the system of the invention, a portion of the high-speed data switch 22 monitors the traffic for the whole network, while a portion of each line interface section 20A, 20B, working in conjunction with the processor 45 connected to it, monitors the traffic for each LAN terminal. It is thus possible to monitor the traffic of high-speed data as well as the traffic of low-speed data in the same manner as performed in the conventional system which monitors the traffic of low-speed data only.

We claim:

1. A switching apparatus to which a plurality of low-speed terminals and a plurality of high-speed terminals are connected via a plurality of transmission lines each for transmitting a signal in which low-speed data from a low-speed terminal and high-speed data from a high-speed terminal are multiplexed, and which is suitable for constructing a switching network among said low-speed terminals and a local area network among said high-speed terminals, comprising:

a plurality of line interface sections, each connected to one of said transmission lines, for demultiplexing the multiplexed signal fed via the transmission line connected thereto into low-speed data and high-speed data, and for multiplexing low-speed data and high-speed data for transmission down the transmission line connected thereto;

a low-speed data switch, connected to said line interface sections, for performing switching of said low-speed data;

a high-speed data switch, connected to said line interface sections, for performing switching of said high-speed data;

storage means for storing the association between the low-speed terminal and high-speed terminal connected to each of said transmission lines; and monitoring control means, connected to said low-speed data switch, said high-speed data switch, and said storage means, for monitoring and controlling the traffic of low-speed data among said low-speed terminals, and for monitoring and controlling the traffic of high-speed data among said high-speed terminals in association with the corresponding low-speed terminals on the basis of the association stored in said storage means.

2. A switching apparatus according to claim 1, further comprising means, connected to said line interface sections, for determining the association between the low-speed terminal and high-speed terminal by reading the address of the high-speed terminal contained in the high-speed data demultiplexed in each line interface section, and for writing the association into said storage means.

3. A switching apparatus according to claim 2, further comprising means, connected to said monitoring control means, for reading and displaying via said monitoring control means the association between the low-speed terminal and high-speed terminal stored in said storage means.

4. A switching apparatus according to claim 2, wherein in accordance with a blocking instruction input by designating a particular low-speed terminal, said monitoring control means blocks the high-speed terminal associated with the designated low-speed terminal.

5. A switching apparatus according to claim 2, wherein said monitoring control means detects a fault in any one of said high-speed terminals and outputs the detected fault status.

6. A switching apparatus according to claim 5, wherein said monitoring control means outputs the detected fault status to the low-speed terminal associated with said faulty high-speed terminal.

7. A switching apparatus according to claim 2, wherein said monitoring control means monitors the traffic for each high-speed terminal.

8. A switching apparatus according to claim 2, wherein said monitoring control means monitors the high-speed data traffic flowing through said high-speed data switch.

* * * * *